(12) United States Patent
Hannson (10) Patent No.: US 10,509,693 B2
(45) Date of Patent: Dec. 17, 2019

(54) METHOD FOR IDENTIFYING A CAUSE FOR A FAILURE OF A TEST

(71) Applicant: VERIFYTER AB, Lund (SE)

(72) Inventor: Daniel Hannson, Lund (SE)

(73) Assignee: VERIFYTER AB, Lund (SE)

( * ) Notice: Subject to any disclaimer, the term of this patent is extended or adjusted under 35 U.S.C. 154(b) by 0 days.

(21) Appl. No.: 15/555,275

(22) PCT Filed: Mar. 4, 2015

(86) PCT No.: PCT/EP2015/054533
§ 371 (c)(1),
(2) Date: Sep. 1, 2017

(87) PCT Pub. No.: WO2016/138953
PCT Pub. Date: Sep. 9, 2016

(65) Prior Publication Data
US 2018/0052725 A1   Feb. 22, 2018

(51) Int. Cl.
*G06F 11/07* (2006.01)
*G06F 11/36* (2006.01)
*G06F 11/08* (2006.01)

(52) U.S. Cl.
CPC .......... *G06F 11/07* (2013.01); *G06F 11/0766* (2013.01); *G06F 11/08* (2013.01); *G06F 11/368* (2013.01); *G06F 11/3688* (2013.01)

(58) Field of Classification Search
CPC ...... G06F 8/71; G06F 11/3668; G06F 11/368; G06F 11/07; G06F 11/0766; G06F 11/08
See application file for complete search history.

(56) References Cited

U.S. PATENT DOCUMENTS 5,671,351 A   9/1997 Wild et al.
6,304,982 B1  10/2001 Mongan et al.
(Continued)

FOREIGN PATENT DOCUMENTS

WO   2012/066091 A1   5/2012

OTHER PUBLICATIONS

International Search Report from International Application No. PCT/EP2015/054533 dated Jul. 1, 2016.
(Continued)

*Primary Examiner* — Marina Lee
(74) *Attorney, Agent, or Firm* — Brundidge & Stanger, P.C.

(57) ABSTRACT

According to an aspect of the present inventive concept there is provided a method for identifying a cause for a failure of a computer-implemented test performed on a latest software code revision in a sequence of a plurality of software code revisions, the method comprising:
  identifying a first revision of said sequence of revisions for which said test passes and a second revision of said sequence of revisions which is subsequent to the first revision and for which said test fails,
  determining a first change between the software code of the first revision and the software code of the second revision,
  generating a first modified version of the software code of the latest revision using the determined first change,
  determining whether said test passes or fails when performed on the first modified version,
  in response to determining that said test fails when performed on the first modified version:
    identifying a third revision and a fourth revision of said sequence which are intermediate the latest revision and the second revision, wherein the third revision is
(Continued)

a revision for which said test passes when said revision is modified using the determined first change, and wherein the fourth revision is subsequent to the third revision and is a revision for which said test fails when said revision is modified using the determined first change, determining a second change between the software code of the third revision and the fourth revision, generating a second modified version of the software code of the latest revision using the first change and the second change, determining whether said test passes or fails when performed on the second modified version, in response to determining that said test passes when performed on the second modified version, providing a message indicating at least the fourth revision as including a cause for said test failing when performed on said latest software code revision.

19 Claims, 3 Drawing Sheets

(56) References Cited

U.S. PATENT DOCUMENTS

| | | | |
|---|---|---|---|
| 7,647,528 B2 | 1/2010 | Yilmaz et al. | |
| 7,836,346 B1 | 11/2010 | Davidoz et al. | |
| 8,479,165 B1 | 7/2013 | Kawashima et al. | |
| 8,707,268 B2 | 4/2014 | Kawashima et al. | |
| 8,745,588 B2 | 6/2014 | Kawashima et al. | |
| 8,813,033 B2 | 8/2014 | Sreedhar | |
| 8,881,109 B1 | 11/2014 | Bridges et al. | |
| 8,935,676 B2 | 1/2015 | Verbest | |
| 8,972,940 B2* | 3/2015 | Kannan | G06F 8/77 717/124 |
| 9,032,371 B2* | 5/2015 | Hansson | G06F 11/3692 714/38.1 |
| 9,684,507 B2* | 6/2017 | Mallisetty | G06F 8/71 |
| 9,703,686 B2* | 7/2017 | dos Santos | G06F 11/3668 |
| 9,921,951 B2* | 3/2018 | Rauenzahn | G06F 11/3688 |
| 2005/0223357 A1 | 1/2005 | Banjerre et al. | |
| 2005/0235263 A1 | 10/2005 | Bundy et al. | |
| 2006/0107121 A1 | 5/2006 | Mendrala et al. | |
| 2006/0294434 A1 | 12/2006 | Ikeda et al. | |
| 2007/0006041 A1 | 1/2007 | Brunswig et al. | |
| 2007/0016894 A1 | 1/2007 | Sreehar | |
| 2008/0109790 A1* | 5/2008 | Farnham | G06F 8/71 717/128 |
| 2008/0120602 A1 | 5/2008 | Comstock et al. | |
| 2009/0089745 A1* | 4/2009 | Johnson | G06F 8/71 717/107 |
| 2009/0328002 A1 | 12/2009 | Lin et al. | |
| 2010/0058294 A1* | 3/2010 | Best | G06F 8/71 717/122 |
| 2010/0299654 A1* | 11/2010 | Vaswani | G06F 11/366 717/128 |
| 2011/0016356 A1 | 1/2011 | Artzi et al. | |
| 2011/0145653 A1 | 6/2011 | Broadfoot et al. | |
| 2013/0091490 A1 | 4/2013 | Mizrahi | |
| 2013/0275949 A1 | 10/2013 | Kawashima et al. | |
| 2014/0157036 A1 | 6/2014 | Walton et al. | |
| 2015/0039941 A1 | 2/2015 | Kalyanasundram | |
| 2016/0306612 A1* | 10/2016 | Hewitt | G06F 8/33 |
| 2016/0306627 A1* | 10/2016 | Hewitt | G06F 8/33 |
| 2018/0052725 A1* | 2/2018 | Hannson | G06F 11/368 |

OTHER PUBLICATIONS

International Search Report from International Application No. PCT/EP2011/0070379 dated Feb. 13, 2013.

C.E. Hyowitz et al.; New Techniques for Failure Analysis and Test Program Design; 1998; retrieved online on Mar. 5, 2015; pp. 1-10; Retrieved from the Internet: <URL: http://www.intusoft.corn/td/itc98.pdf> (cited in U.S. Pat. No. 9,032,371).

ChangHai Nie and Hareton Leung; The Minimal Failure-Causing Schema of Combinatorial Testing; ACM; Sep. 2011; retrieved online on Mar. 5, 2015; pp. 1-38; Retrieved from the internet: <URL: http://delivery.acm.org/10.1145/2010000/2000801/a15-nie.pdf?> (cited in U.S. Pat. No. 9,032,371).

Larry Kirkland et al.; Evaluating Go-Path Measurements to Determine Faulty Components "The Skill of the Test is the Software"; IEEE; 2004; retrieved online on Mar. 5, 2015; pp. 338-343; Retrieved from the internet: <URL: http://ieeexplore.ieee.org/stamp/stamp.jsp?tp=8&arnumber=1436872> (cited in U.S. Pat. No. 9,032,371.

* cited by examiner

METHOD FOR IDENTIFYING A CAUSE FOR A FAILURE OF A TEST

TECHNICAL FIELD

The present inventive concept relates to a method for identifying a cause for a failure of a test performed on a latest software code revision in a sequence of a plurality of software code revisions.

BACKGROUND

In software development, testing of the software code to detect faults or errors generally forms an integral and important part of the development phase. Different types of tests may be used to detect different types of faults. Tests may be defined to detect logical or syntactical errors, i.e. "bugs", in the code. Tests may also be defined to detect performance-related faults, such as the failure of the software to meet predetermined performance standards. In the art, several types of testing methodology exist.

One type of testing methodology is known as regression testing. Regression testing may generally be defined as any type of testing that seeks to uncover software errors after changes to the software code have been made, by retesting the software code. The aim of regression testing is to ensure that a change, such as a bug fix or introduction of a new functionality, does not introduce faults. Experience has shown that during bug fixing, emergence of new and/or reemergence of old faults is quite common. Therefore it is considered good practice to perform regression testing regularly during the development phase to catch any new bugs that are inadvertently introduced into the software as early as possible.

Figure 1:
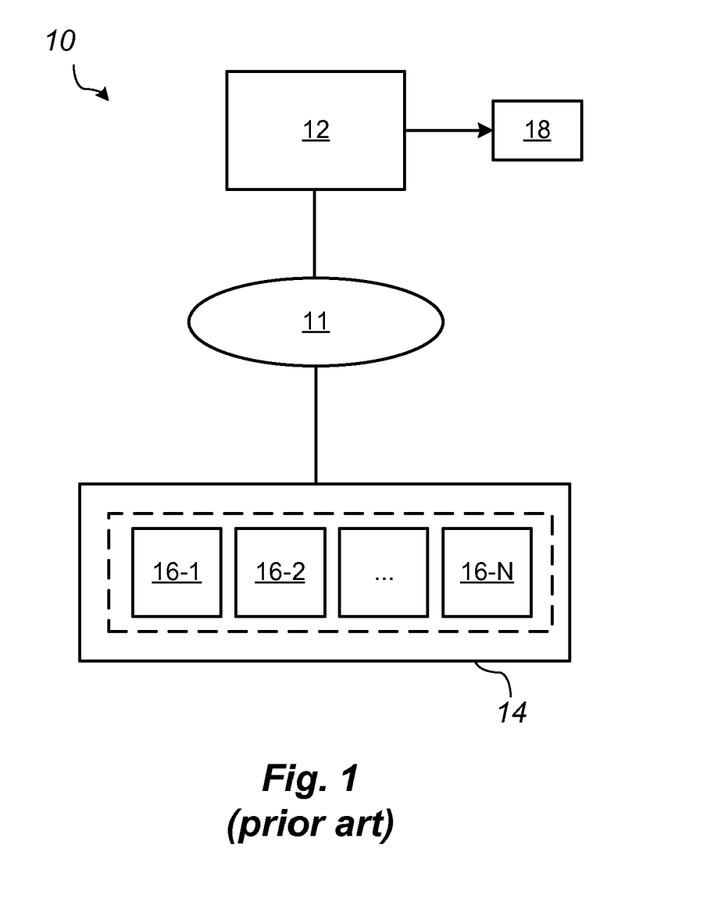
FIG. 1 is a schematic illustration of a prior art system.

The tests are normally performed by a computer-implemented test system, which performs one or more specified tests on a revision of the software code and reports the test result(s). By way of example FIG. 1 schematically illustrates a typical prior art system 10 including a test system 12 communicatively coupled to a version control system 14 via a communications interface 11 such as a network. The version control system 14 maintains a data store storing the latest and previous revisions 16-1, 16-2, . . . , 16-N of the software code. Each revision may be defined by a software code file of a different version, or by a combination of a plurality of software code files of different versions. When a developer fixes a bug or introduces new functionality to the software the developer must update (i.e. "commit" or "check in") the affected files in the version control system 14. The update results in new versions of the relevant files being created. The new versions of the files, together with the most recent versions of the pre-existing unchanged files, together define a new revision. Hence, over time a sequence of revisions of the software code will be stored by the version control system 14. The version control system 14 maintains a record of which versions of the software code files which together form each respective revision.

The test system 12 may perform one or more tests on one or more of the revisions 16-1, 16-2, 16-N. The test system 12 reports the outcome of the one or more tests as a test results data set indicating the result of each test as a "pass" or a "fail" for each tested revision. In the art, the software code revision (such as revision 16-N) which is tested, is sometimes referred to as the revision of "the device" under test.

As is known in the art, the number of "commits" (and hence the number of revisions created) during a day may become great. For example, in larger projects it is not uncommon that revisions numbering in the order of hundreds are created each day. This means that it is generally impractical to perform tests on each and every revision. Instead, tests are often started at regular intervals (e.g. at the end of each working day). Therefore if a test fails for a latest revision in a sequence of revisions, the latest revision may be preceded by a plurality of earlier revisions for which no test result is available. Therefore it is generally not possible to deduce from the test result for the latest revision what change(s) caused the test to fail.

By virtue of being automatic, the testing does not require much human resources even if performed frequently. However, this is not true when it comes to debugging when tests fail since the cause for the test failure generally must be identified or debugged manually. Debugging is time consuming and expensive in terms of human resources. The total time spent on debugging is a critical factor affecting when a product under development can be released. Also the amount of resources available restricts how often it is meaningful to perform testing, as resources must be available for debugging the failures. In turn, this may reduce the quality of the software and increase the development time.

SUMMARY OF THE INVENTIVE CONCEPT

An objective of the present inventive concept is to provide a method which enables identification of a cause for a test failing on a revision of a software code, without the need for human intervention. Further objects may be understood from the following.

According to an aspect of the present inventive concept there is provided a method for identifying a cause for a failure of a computer-implemented test performed on a latest software code revision in a sequence of a plurality of software code revisions, the method comprising:

identifying a first revision of said sequence of revisions for which said test passes and a second revision of said sequence of revisions which is subsequent to the first revision and for which said test fails, determining a first change between the software code of the first revision and the software code of the second revision, generating a first modified version of the software code of the latest revision using the determined first change, determining whether said test passes or fails when performed on the first modified version, in response to determining that said test fails when performed on the first modified version:

identifying a third revision and a fourth revision of said sequence which are intermediate the latest revision and the second revision, wherein the third revision is a revision for which said test passes when said revision is modified using the determined first change, and wherein the fourth revision is subsequent to the third revision and is a revision for which said test fails when said revision is modified using the determined first change, determining a second change between the software code of the third revision and the fourth revision, generating a second modified version of the software code of the latest revision using the first change and the second change, determining whether said test passes or fails when performed on the second modified version, in response to determining that said test passes when performed on the second modified version, providing a message indicating at least the fourth revision as being a revision including a cause for said test failing when performed on said latest software code revision.

The inventive computer implemented method enables identification of the second revision, which may be considered as candidate to the revision in which a cause for the test failure of the latest revision was introduced. The method does however not stop at this identification but rather proceeds with validating whether the second revision includes the actual cause for the test failure of the latest revision. The validation includes generating the first modified version of the software code of the latest revision using the determined first change and determining whether the same test as performed on the latest revision passes when performed on the first modified version. As realized by the inventor, in a given sequence of revisions of the software code, the second revision may not be the sole "candidate revision", but faults may have been introduced in further revisions. The inventive method enables such a scenario to be detected by detecting if the test fails when performed on the first modified version of the latest software code revision. In that case, the method enables identification of the fourth revision, which may be considered as a second candidate revision. The method further proceeds with attempting to validate also whether the fourth revision includes the actual cause for the test failure of the latest revision. As realized by the inventor, if the second validation is successful (i.e. if the test passes when performed on the second modified version of the latest software code revision) at least the fourth revision includes a cause for the test failure of the latest revision. Accordingly, the method may provide a message (e.g. to a bug tracking database or to a developer responsible for the fourth revision) identifying at least the fourth revision as including a cause for said test failing when performed on said latest software code revision. The method may thereby provide an automatic debugging of the latest revision.

An additional benefit of the inventive method is that it enables automatic determination of the software code changes made in the candidate revision(s) which may have caused test failure, thereby reducing the time needed for manual code checking. Additionally, the method enables generation, without requiring user intervention, of one or more modified versions of the latest software code revision for which the test passes. The one or more modified and "debugged" versions may hence be used as a starting point for further, improved, revisions.

A "test failure" or "failure of a test" may be construed as a test result of the test indicating that the software code revision did not meet a predefined criterion or a predefined set of criteria of the test. A "test passing" or "a test being successful" may be construed as a test result of the test indicating that the software code revision did meet a predefined criterion or a predefined set of criteria of the test.

A "test", performed on a revision may refer to a computer implemented test which may be performed or executed by a data processing system. Generally, performing a test on a software code revision may include: executing a set of software instructions evaluating whether the software code of said revision meets (or not) a predefined criterion or a predefined set of criteria, recording a test result for said revision in a test result data set, the data set indicating that said passed if the criterion/criteria was/were met or that said test failed if the criterion/criteria was/were not met.

The method may further comprise, in response to determining that said test passes when performed on the first modified version, providing a message indicating the second revision as being a revision including a cause for said test failing when performed on said latest software code revision. Thereby, the method enables detection of a scenario wherein only the first change between the first and the second revisions introduced a cause for the test failure. Additional validation may hence be avoided and thereby reduce the loading of the data processing system performing the method and the testing.

The method may further comprise receiving test results data resulting from said test being performed on at least a subset of the revisions of said sequence, the test results data indicating, for each revision of said at least a subset, whether said test passed or failed when said test was performed on said each revision. The first, the second, the third and the fourth revisions may hence be identified on the basis of the test results data resulting from the performing of said test on said at least a subset of revisions.

In particular, said at least a subset of revisions may form a subset of consecutive revisions. A latest revision of said subset may furthermore be separated from said latest revision of said sequence by at least one revision. By virtue of validating an identified tipping point, the method does not require that every revision between the latest revision and the second revision are tested. If further failing (not yet identified) revisions exist between the latest revision and the second revision, such revisions may be identified during subsequent identifications of tipping points. Hence, the total number of tests performed during the course of the method may be reduced thereby freeing up computational resources.

The first revision and the second revision may be identified by determining, using the test results data, a first pair of consecutive revisions in said sequence such that an earlier revision of the first pair is a revision for which the test results data indicates that said test passed and a later revision of the first pair is a revision for which the test results data indicates that said test failed. Thus, the earlier revision of the first pair is determined as the first revision and the later revision of the first pair is determined as the second revision. Put differently, the first revision may be identified by determining, using the test results data, an earliest revision in the sequence of revisions for which the test results data indicates that said test passed, and wherein the second revision may be identified by determining, using the test results data, a revision directly subsequent to the earliest revision and for which the test results data indicates that said test passed.

The identification of the first and the second revision may be performed in response to determining that said test fails when performed on the latest software code revision. This enables the method to be triggered to start as soon as a test fails for a latest revision. The earlier the method is performed, the earlier the cause for the test failure may be identified.

The method may further comprise: receiving test results data from said test being performed on the first modified version, the test results data indicating whether said test passed or failed when said test was performed on the first modified version, wherein said determining whether said test passes or fails when performed on the first modified version is based on the received test results data. A test result for the first modified version may thereby be obtained.

The method may further comprise: receiving test results data resulting from said test being performed on the second modified version, the test results data indicating whether said test passed or failed when said test was performed on the second modified version, wherein said determining whether said test passes or fails when performed on the second modified version is based on the received test results data. A test result for the second modified version may thereby be obtained.

The first modified version of the software code of the latest revision may be generated using the first change such that a software code portion added between the first revision and the second revision is not included in the first modified version, and such that a software code portion removed between the first revision and the second revision is included in the first modified version. The second modified version of the software code of the latest revision may be generated using the first change and the second change such that a software code portion added between the first revision and the second revision and a software code portion added between the third revision and the fourth revision are not included in the second modified version, and such that a software code portion removed between the first revision and the second revision and a software code portion removed between the third revision and the fourth revision are included in the second modified version. Hence, any characters or code lines introduced or deleted between the first and the second revision, and between the third and fourth revision, respectively, may be deleted or inserted in a (first or second) modified version of the latest revision, without manual intervention.

According to one embodiment the method further comprises generating a third modified version of the software code of the latest revision using the second change (but not the first change), wherein, subsequent to determining that said test passes when performed on the second modified version, the method comprises (in order determine whether said test failed on said latest software code revision due to the first change, the second change or due to the first and the second changes in combination):

determining whether said test passes or fails when performed on the third modified version, and providing, in response to determining that said test fails when performed on the third modified version, a message indicating the second revision and the fourth revision as being revisions including a cause for said test failing when performed on said latest software code revision, or providing, in response to determining that said test passes when performed on the third modified version, a message indicating the fourth revision, but not the second revision, as being a revision including a cause for said test failing when performed on said latest software code revision.

This embodiment enables the method to detect the scenario where the fault or error introduced between the first and second revisions has been manually fixed in a later revision, however after a different fault or error has been introduced between the third and the fourth revision. By catching this scenario one may avoid reporting the second revision as a cause for the test failure on the latest revision.

The method may further comprise receiving test results data resulting from said test being performed on the third modified version, the test results data indicating whether said test passed or failed when said test was performed on the third modified version, wherein said determining whether said test passes or fails when performed on the third modified version is based on the received test results data. A test result for the third modified version may thereby be obtained.

The third modified version of the software code of the latest revision may be generated using the second change, but not the first change, such that a software code portion added between the third revision and the fourth revision is not included in the third modified version, and such that a software code portion removed between the third revision and the fourth revision is included in the first modified version. Hence, any characters or code lines introduced or deleted between the third and the fourth revision may be deleted or inserted into the latest revision, without manual intervention. In other words the second change may be undone, or "unrolled" from the latest software code revision.

The third modified version of the software code may be generated subsequent to determining that said test passes when performed on the second modified version.

According to one embodiment the sequence of software code revisions are stored in a storage area by a version control system, each revision being represented by a different set of one or more software code file objects. The software code of different revisions may thereby be accessed by the method. A version control system may keep track of the sequence of revisions and the various versions of the software code file objects thereof.

The method may further comprise retrieving from the version control system information regarding a user identity associated with each of the one or more revisions determined as including a cause for said test failing when performed on said latest software code revision, and sending an instance of said message to each one of said user identities. Hence, the developer responsible for committing the changes to the software code may be informed of the test failure and the cause of the failure. If this reporting functionality is used in conjunction with the above-described embodiment including generation of the third modified version, an added advantage is that sending of a message instance to the developer responsible for committing the changes to the software code of the second revision may be avoided. Thereby the number of message instances may be minimized. In the scenario that the error introduced in the second revision already has been manually fixed, sending a message instance to the committer of the second revision may result in unnecessary message traffic (and thus e.g. result in unnecessary network traffic) and also trigger the receiver to debug an error which already has been fixed.

The method may further comprise providing user access to one or more of the first, the second or the third modified versions of the latest revision. A developer may thereby gain access to one or more modified versions of the latest revision for which said test passes. The one or more modified and "debugged" versions may hence be used as a starting point for further, improved, revisions.

The method may further comprise sending data representing one or more of the first, the second or the third modified versions of the latest revision to the version control system for storage by the version control system as an updated latest revision. Thereby any developer having access rights to the version control system may gain access to one or more modified versions of the latest revision for which said test passes. The one or more modified and "debugged" versions may hence be used as a starting point for further, improved, revisions.

According to one embodiment, said test belongs to a group of tests and the method further comprises:

in response to determining that said test passes when performed on the first modified version: determining whether each other test of said group of tests passes or fails when performed on the first modified version, and removing from said group of tests each test which fails when performed on the first modified version, or in response to determining that said test passes when performed on the second modified version: determining whether each other test of said group of tests passes or fails when performed on the second modified version, and removing from said group of tests each test which fails when performed on the second modified version, or in response to determining that said test passes when performed on the third modified version: determining whether each other test of said group of tests passes or fails when performed on the third modified version, and removing from said group of tests each test which fails when performed on the third modified version.

The group of tests may be an initially manually defined group of tests (i.e. prior to performing this embodiment of the method) under the assumption that the results of the tests of the group are related. By this embodiment, the group may be gradually reduced to a smaller group of tests which all fail for the same cause, e.g. due to the error(s) introduced at one or more of the identified tipping points. The grouping may thus be automatically tested and updated on the basis of the result of the testing on the first/second/third modified version, and thus without performing each test of the group on every revision of the sequence of revisions.

Said test may be the test of the group of tests which meets a predetermined performance criterion, such as being the test presenting the shortest execution time or being the test having the smallest memory requirements. Hence, the tipping point(s) and the modified version(s) of the latest revision may be identified and generated, respectively, on the basis of performing only the test of the group of tests which meets the predetermined performance criterion.

According to a second aspect of the present inventive concept there is provided a method for identifying a cause for a failure of a computer-implemented test performed on a latest software code revision in a sequence of a plurality of software code revisions, the method comprising:

identifying a first revision of said sequence of revisions for which said test passes and a second revision of said sequence of revisions which is subsequent to the first revision and for which said test fails, determining a change between the software code of the first revision and the software code of the second revision, generating a modified version of the software code of the latest revision using the determined first change, and determining whether said test passed or failed when performed on the modified version.

Hence, on the basis of the determination the method may validate whether the second revision includes the cause for the failure of the test on the latest revision or not. Hence according to the second aspect the validation of whether the second revision includes the actual cause for the test failure of the latest revision represents an independent inventive concept which is more general than the first aspect of the inventive concept described above.

The method may further comprise, in response to determining that said test passes when performed on the modified version, providing a message indicating the second revision as including a cause for said test failing when performed on said latest software code revision. If said test fails on the modified version it may be concluded that a cause for the test failure is present also, or alternatively, in one or more revision which are later in the sequence of revisions than the second revision.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings. In the drawings like reference numerals will be used for like elements unless stated otherwise.

DETAILED DESCRIPTION OF PREFERRED EMBODIMENTS

Detailed embodiments of the present inventive concept will now be described with reference to the drawings.

Figure 2:
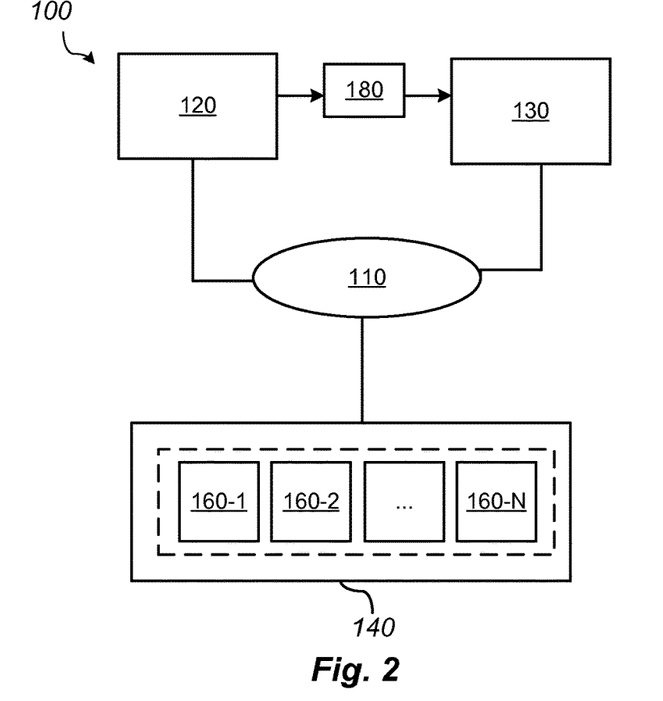
FIG. 2 is a schematic illustration of a system in which embodiments of the invention may be performed.

FIG. 2 schematically illustrates a system 100 including a test system 120, a version control system 140 and an automatic debug system 130 (or shorter "debug system" 130). The test system 120 and the version control system 140 in FIG. 2 generally correspond to the test system 12 and the version control system 14 in FIG. 1, respectively.

The present disclosure is applicable for testing software written in any currently available programming language such as C, C++, Java, Python, Perl, System Verilog, Verilog, bash, batch or a combination thereof, to name a few. More generally, the testing can be performed on any type of product that is defined as software code during the development phase (which is the time when testing is performed), but the end-product does not need to be software. For example, some hardware such as most digital integrated circuits is defined during the development phase in a hardware description language, which is a type of software. The integrated circuit becomes hardware at the end of the development phase in the fabrication plant. Consequently, from a testing point of view, integrated circuit development is a kind of software development during the development phase, and as such is suitable for testing as described herein.

Each one or any of the test system 120, the debug system 130 and the version control system 140 may be implemented on a same, or on a respective, data processing system or computing device, such as a computer, a personal computer, a work station, a laptop or other portable computing device. It is also possible that each one of the test system 120, the debug system 130 and the version control system 140 run on one or more distributed systems including a plurality of computing devices. For example, it may in some cases be beneficial to run the test system 120 on a distributed system wherein tests may be performed in parallel by different computing devices of the distributed system. In any case the test system 120, the debug system 130 and the version control system 140, as described herein, may be realized as a set of computer programs defined by computer executable instructions.

Figure 3:
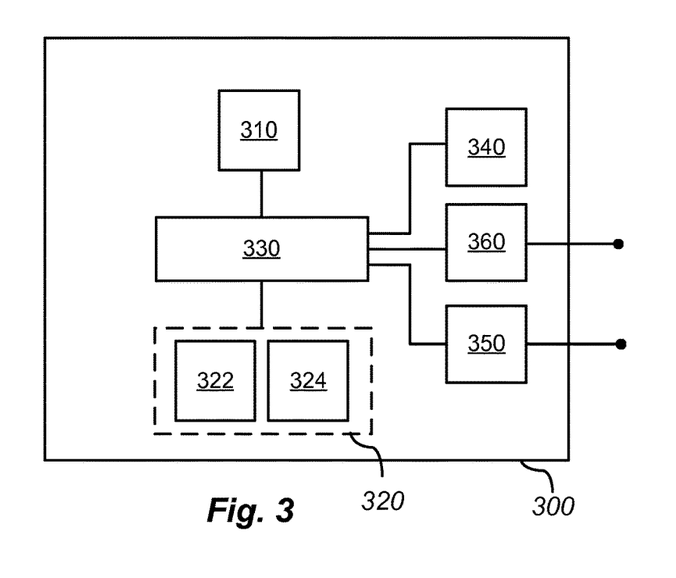
FIG. 3 is a schematic illustration of a computing device.

FIG. 3 schematically illustrates a data processing system in the form of a computing device 300 which may be arranged to implement any one, or all of the test system 120, the debug system 130 and the version control system 140, either separately, or in case of distributed computing, in combination with one or more other corresponding computing devices. The computing device 300 may include processing circuitry 310. The processing circuitry 310 may in this case refer to a single- or a multi-processor architecture including one or more single- or multi-core CPUs. The computing device 300 may further include a memory 320. The memory 320 may in this case refer to a volatile memory such as a Random Access Memory (RAM). The memory 320 may include a data section 322 for storing inter alia data which is processed by the processing circuitry 310 during operation of the computing device 300. The memory 320 may include a program section 324 for storing program instructions implementing the software functions to be performed by the processing circuitry 310. The processing circuitry 310 may have read and write access to the memory 320 via a data bus 330 or the like. The computing device 300 may further include a storage device 340 such as one or more hard disk drives, one or more internal flash-based drives (e.g. SSDs), optical storage mediums (e.g. CD-ROM or DVD-ROM), or some other type of removable storage device (e.g. one or more USB-drives), or combinations thereof. The storage device 340 may also be provided in the form of a Network Attached Storage. The computing device 300 may further include a wired and/or wireless network interface 350 for communicating with other computing devices over a network, such as a LAN, a WAN and/or the Internet. The computing device 300 may further include an I/O interface 360 for receiving and providing interaction with a user e.g. via an input device (such as a mouse and/or a keyboard) and a display device. During operation of the computing device 300, program instructions for execution by the processing circuitry 310 may be loaded into the program section 324 from the storage device 340. More generally, the software may be stored as a computer program product on a tangible computer-readable storage medium including instructions arranged to be executed by the processing circuitry 310, e.g. when loaded into the memory 320. Program instructions may also be stored as firmware in a non-volatile memory such as a ROM. The functions performed by the computing device 300 may be written in one or more programming or scripting languages such as C, C++, Java, Python, Perl, System Verilog, Verilog, bash, batch to name a few. As an alternative to software-based implementations of the functions performed by the test system 120, the debug system 130 and the version control system 140, respectively, may be implemented directly in hardware for example by dedicated circuitry and/or application specific integrated circuit(s) (ASICS).

The test system 120 is an entity (e.g. a software running on a computing device 300) capable of performing a test on a specified revision. The test system 120 may perform, based on a schedule, or responsive to requests from for example the debug system 130, one or more automatic and computer-implemented tests on one or more specified software code revisions. In particular, the test system 120 may perform regression testing on the device under test. Upon completion of the one or more tests the outcome thereof may be output as a test results data set 180, typically to the requestor of the tests such as the debug system 130. The test system 120 may retrieve the software code files of the relevant revision(s) to be tested from the version control system 140. If implemented on respective computing devices 300, the test system 120, the version control system 140 and the debug system 130 may be communicatively connected, for example by their respective network interfaces 350 via a network 110, as illustrated in FIG. 2.

The version control system 140 is arranged to provide revision control of the software code defining a software product or "device". The version control system 140 stores the latest (i.e. the most current revision) and previous revisions 160-1 . . . N of the software code. The files or file objects including the software code of the revisions may be stored in one or more repositories. If implemented on a computing device such as computing device 300, the files may be stored in the storage device 340 thereof. The version control system 140 may maintain (e.g. in the storage device 340) a database keeping track of which versions of the files represent a particular revision. The database may further keep track of the identity of the user (e.g. a user name or an email address) responsible for checking in each version of the file objects. The database may further include entries indicating the date and/or the time of check in. Accordingly, each revision may be associated with the date and/or time of the check in of a new version of a software code file. In other words, each revision represents a particular state of the one or more repositories of the version control system 140. There are many different types of version control systems. The methods described herein are not limited to interworking with a particular type of version control system. As a few non-limiting examples, the version control system 140 may be implemented using currently available revision control software such as Git, Perforce, Subversion, ClearCase, DesignSync, RCS, SCCS or CVS.

One difference between currently available version control systems is whether a global revision number exist for the entire repository. The concept of global revision numbers (or shorter "global revisions") may be better understood from the non-limiting example depicted in Table 1 schematically illustrating how the global revision number is incremented when a new version of any one of Files 1-3 of an example device or software product is checked in at the version control system 140. Thus the global revision number is a revision number for the entire state of the one or more repositories of the version control system 140. For example, the global revision number was incremented to 5 (the latest revision Table 1) in response to File 2 being updated to version 1.1 on November 26. As another example, the global revision number was earlier incremented to 3 in response to File 1 being updated to version 1.2 on November 24.

In the following it will be assumed that the version control system 140 maintains a global revision number, thereby allowing the debug system 130 to rely on global revision numbers during testing and communication with the test system 120 and the version control system 140, as well as during the internal operations of the debug system 130. The principles of the methods described herein are however also applicable when used in conjunction with systems not implementing the concept of global revision numbers. In such a case, the debug system 130 may create a global revision number 506 by applying the same principles as described in connection with Table 1 and use the global revision numbers for internal operations. Thus, when requesting the test system 120 to perform a test on a particular revision, or when retrieving a particular revision from the version control system 140, the debug system 130 may translate the internal global revision number maintained by the debug system 130 to a format which the test system 120 and/or the version control system 140 is capable or interpreting. For example, a global revision number may be translated to a particular state of the repository/repositories at a specific time, or a listing of all source code files and versions thereof which define the particular revision. The particular type of translation will depend on the type of version control system that is being used. In any event, each global revision number, whether maintained by the debug system 130 or the version control system 140, corresponds to a particular state of the repository at a specific time (e.g. the check-in time in Table 1).

TABLE 1

| Global Revision No | File 1-Version No | File 2-Version No | File 3-Version No | Check in time |
|---|---|---|---|---|
| 5 | 1.3 | 1.1 | 1.5 | 26 Nov |
| 4 | 1.3 | 1.0 | 1.5 | 25 Nov |
| 3 | 1.2 | 1.0 | 1.5 | 24 Nov |
| 2 | 1.1 | 1.0 | 1.5 | 23 Nov |
| 1 | 1.1 | 1.0 | 1.4 | 22 Nov |

A test performed by the test system 120, or as the case may be by the debug system 130, on one or more revisions may be defined by a set of software instructions, such as in the form of a test program or test script which may be executed by data processing system. The scripting language to use may depend on the platform on the specifics of the test. A test program or a test script may for example be written in any currently available programming language such as C, C++, Java, Python, Perl, System Verilog, Verilog, bash, batch or a combination thereof. A test may generally be arranged to evaluate whether the software code (all or a subset thereof) of a given revision meets a predefined criterion or a predefined set of criteria. Several types of tests are possible. A non-limiting list of example tests will now be given:

One type of test (which may be referred to as a "build test") may be arranged to determine whether the software code (all or a subset thereof) of a given revision may be successfully compiled. The criterion for the test "passing" may be that the compilation is successful. The criterion for the test "failing" may be that the compilation fails. As a specific and non-limiting example, a "build test" may include instructions invoking a compiler for compiling the software code of the given revision and optionally invoking a linker for linking files output by the compiler. The test may be arranged to terminate and output a return value (i.e. an "exit code") indicating a "test failure" for the revision if the compiler (or the linker as the case may be) returns a value representing failure of the compilation (or the linking). The test may be arranged to terminate and output a return value indicating a "test pass" for the revision if the compiler (and if applicable also the linker) returns a value representing success of the compilation (and the linking). The test system 120 or the debug system 130 may in turn interpret the return value provided to the test and record a result of the test as either "failed" or "passed".

Another type of test (which may be referred to as a "syntax test", or as a special case of a "build test") may be arranged to determine whether the software code (all or a subset thereof) passes a syntax check. The criterion of the test "passing" may be that the syntax check does not reveal any syntax errors. The criterion of the test "failing" may be that the syntax check reveals one or more syntax errors.

Another type of test (which may be referred to as a "performance test") may be arranged to evaluate whether a given revision (e.g. once compiled and linked to create computer executable instructions) fulfills a predetermined performance requirement. The criterion of the test "passing" may be that the revision meets or exceeds the predefined performance requirement. The criterion of the test "failing" may be that the revision does not meet the predefined performance requirement. Non-limiting examples of performance requirements may be a maximum execution time, a maximum memory footprint, a minimum data throughput etc.

Another type of test (which may be referred to as a "runtime test") may be arranged to evaluate whether a given revision (e.g. once compiled and linked to create computer executable instructions) provides an expected output in response to a predetermined set of values of an input parameter. The criterion of the test "passing" may be that the output corresponds to the expected output for the entire set of values of the input parameter. The criterion of the test "failing" may be that the output deviates from the expected output for at least one value of the set of values of the input parameter.

Figure 4:
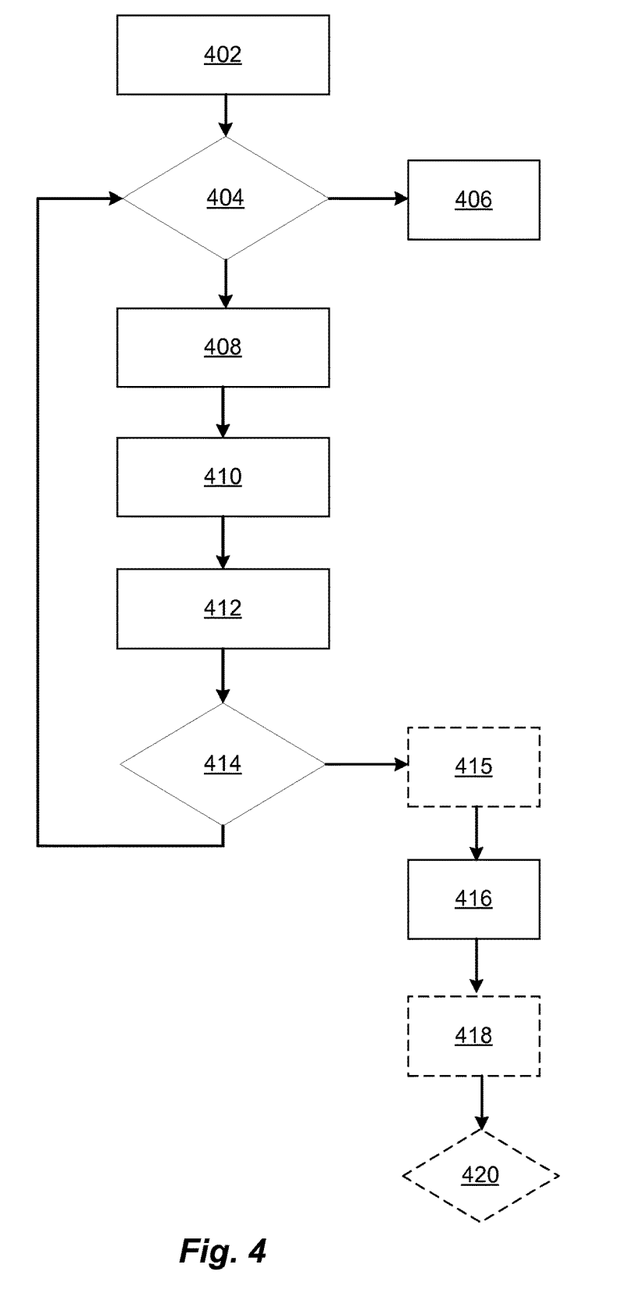
FIG. 4 is a flow-chart depicting a method performed by a debug system.

A method performed by the debug system 130 for identifying a cause for a failure of a computer-implemented test performed on a latest software code revision in a sequence of a plurality of software code revisions will now be described with reference to the flow-chart in FIG. 4.

The starting point for the method is that a test performed by the test system 120 fails on the latest revision (box 402). The debug system 130 may request the test system 120 to perform the test on the latest revision available in the version control system 140. In FIG. 2, revision 160-N represents the latest revision in the sequence of revisions 160-1 . . . N. The test system 120 may perform the test and transmit the test result data 180 to the debug system 130.

It should be noted that in the following method description, the content of "the test", regardless of what revision is the object or target of "the test", is identical (i.e. in terms of the evaluation performed by the test and the predefined criterion or predefined set of criteria) to the test performed to yield the failing test result on the latest revision in box 402. In other words "the test" should be construed as referring to the same or identical test although the object (e.g. a revision) of the test may be different. Performing the test on one revision and performing the test on another revision may hence be expressed as performing a first instance of the test on one revision and a second instance of the test on another revision.

The debug system 130 may analyze the received test result data 180, and on a condition that the test has failed on the latest revision 160-N (which is the assumption in the following description), the method proceeds with attempting to identify a first revision in the sequence of revisions 160-1 . . . N on which the test passes and a second revision, subsequent and consecutive to the first revision, and on which the test fails (box 404). The first revision and the second revision may be referred to as a first pair of revisions forming a first "tipping point" in the sequence of revision 160-1 . . . N, i.e. the point at which the test first failed. The first revision 160-i (where i is in the interval 1 to N−1) may thus form the last revision in the sequence of revisions 160-1 . . . N for which the test passed. The second revision 160-j (where j=i+1) may thus form the earliest revision in the sequence of revisions 160-1 . . . N for which the test failed. The second revision 160-j may be referred to as a first candidate revision 160-j. It is a candidate to being a revision including a cause for the test failure of the latest revision 160-N.

In more detail, the debug system 130 may request the test system 120 to perform the same test on revisions preceding the latest revision 160-N until a tipping point can be identified. The debug system 130 may obtain information regarding which revisions exist e.g. by querying the version control system 140 to provide information regarding which and/or how many revisions are stored by the version control system 140. The debug system 130 may iteratively send requests to the test system 120 for gradually older revisions until the tipping point can be identified. Alternatively, the debug system 130 may request, each time, that the test is performed on a predetermined number of consecutive revisions preceding/predating the latest revision. In response to receiving test results for the requested revisions, the debug system 130 may attempt to identify the tipping point on the basis of the available test results.

Optionally, the identification of the first tipping point may be performed on the basis of test results for only a subset of the sequence of revisions 160-1 . . . N. The debug system 130 may for example request the test system 120 perform the same test on a subset of consecutive revisions of the sequence of revisions 160-1 . . . N. This subset of revisions may be separated from the latest revision 160-N by one or more revision. The number of untested revisions intermediate revisions may be a predetermined number, based on experience, or may be calculated on the basis of the number of revisions in the sequence of revisions. The number may for example be proportional to the number of revisions in the sequence of revisions. If no tipping point can be identified in the test results for said subset, the identification of a first tipping point may be performed on the basis of test results for a further subset of consecutive revisions of the sequence of revisions 160-1 . . . N (e.g. requested from the test system 120). Hence, the total number of tests performed during the course of the method may be reduced thereby freeing up computational resources.

For practical limitations of time and computer resources users may want to limit how far back in time the method proceeds, i.e. the maximum number of revisions preceding the latest revisions that will be tested. Hence, it is possible that cause for the test failure was introduced beyond this limit. To handle such a scenario, the method may terminate if the maximum number of earlier revisions have been tested without any tipping point being identified, or if no further revisions are stored at the version control system 140 (box 406). The debug system 130 may accordingly generate a message indicating that the cause for the test failure has not been identified. The message may be sent to the developers which have committed the tested revisions and/or to a bug tracking database wherein a manual analysis may be initiated. The relevant developers may be identified by the debug system 130 interrogating the version control system 140 which may return a message to the debug system 130 identifying the user(s) (e.g. by user name or by email address) responsible for the change in each tested revision of the sequence of revisions 160-1 . . . N.

Subsequent to identifying the tipping point the method proceeds with determining a change (hereinafter referred to as "the first change") made to the software code between the revision 160-$i$ and 160-$j$ (box 408). Typical changes of the software code may be addition, deletion and/or replacement of one or more lines or characters in the software code. A change may also include the addition or deletion of one or more files of software code. The debug system 130 may retrieve all files, or only changed/added/deleted files, of the revisions representing the tipping point and compare the files which have been modified (e.g. as indicated by the version control system 140) and/or by determining whether one or more files have been added or removed between the revisions. Changes between files may be determined for example by a character- or line-based comparison of an older and a newer version of a file. Changes may also be determined using file comparison tools available in the art, such as the diff utility commonly included with Unix-, Linux- or BSD-distributions or the utility google-diff-match-patch. Regardless of how the changes are determined, the debug system 130 may generate one or more files which list every change which has been made in the software code. Such files may be referred to as "patches" or "diffs". If the debug system 130 is implemented on a computing device such as computing device 300, the one or more generated files may be stored in the storage device 340.

The method proceeds with generating a first modified version of the software code of the latest revision using the determined first change (box 410). The debug system 130 may retrieve all files forming the latest revision from the version control system 130 (e.g. by using a check-out procedure of the version control debug system 130). The modified version of the latest revision may be generated using the determined first change such that any software code portions added between the first revision 160-$i$ and the second revision 160-$j$, i.e. in the one or more modified files of the second revision 160-$j$, are not included in the first modified version, and such that any software code portions removed between the first revision 160-$i$ and the second revision 160-$j$, i.e. in the one or more modified files of the second revision 160-$j$, are included (i.e. reintroduced) in the modified version. Thereby, changes made between the first revision 160-$i$ and the second revision 160-$j$ may be undone, or "unrolled" from the latest software code revision 160-N. Thus a first modified or "patched" version of the latest revision 160-N may be automatically generated. Files which have been added or deleted in its entirety between the first revision 160-$i$ and the second revisions 160-$j$ may be deleted or added, respectively. The source code files may be modified using patching tools available in the art, such as the patch utility commonly included with Unix-, Linux- or BSD-distributions or the utility google-diff-match-patch which may generate a modified source code file (e.g. a modified source code file of the latest revision) from an original source code file (i.e. the original source code file of the latest revision) and the "patch" or "diff" file generated in the preceding comparison of the revisions identified as the tipping point. If the debug system 130 is implemented on a computing device such as computing device 300, the files representing the first modified version may be stored in the storage device 340.

After the debug system 130 has generated the first modified version of the latest revision 160-N, the debug system 130 requests the test system 120 to perform the same test (in other words re-test) on the first modified version of the latest revision 160-N (box 412). The request may for example include a reference to the first modified version stored at the debug system 130, allowing the test system 120 to access the files of the first modified version. The reference may for example be provided in the form of a link, such as an URL, to a folder/directory in the storage device 340 storing the files of the first modified version. Upon receiving the test results data from the test system 120 the debug system 130 may determine whether the test passed or failed on the first modified version of the latest revision 160-N on the basis of the test results data (box 414).

If the test results data indicates that the test passed, the method may conclude that the first change between the first revision 160-$i$ and the second revision 160-$j$ introduced a cause for the test failure for the latest revision 160-N. Hence the first candidate revision may be determined by the debug system 130 as the revision including a cause for the test failure of the latest revision 160-N. Accordingly, the debug system 130 may generate a message indicating the second revision 160-$j$ as including a cause for the test failure of the latest revision (box 416). The message may be sent to the developer(s) which have committed the tested revisions and/or to a bug tracking database wherein a manual analysis of the source code of the second revision 160-$j$ may be initiated. As described above, the relevant developer(s) may be identified by the debug system 130 interrogating the version control system 140 which may return a message to the debug system 130 identifying the user(s) (e.g. by user name or by email address) responsible for the change in each tested revision of the sequence of revisions 160-1 . . . N. The message may further include information regarding one or more or a combination of the following: an indication of the first revision 160-$i$ as the last unmodified revision on which the test passed; information regarding the changes which were made between the first revision 160-$i$ and the second revision 160-$j$ (e.g. by including the content of one or more of the "diff" files or a reference to the "diff" file(s) stored at the debug system 130. Additionally or alternatively, the message may include data (e.g. in the form of a link, such as an URL, to a folder/directory in the storage device 340 storing the diff file(s)) providing the recipient of the message access to the first modified version of the latest revision stored at the debug system 130. Optionally, the debug system 130 may upload the first modified version to the version control system 140, thereby making available by the version control system 140, a new latest revision, subsequent to the latest revision 160-N, on which the test passes.

Subsequent to providing the message, the method may terminate. Hence the subset of the illustrated method which is associated with box 402-416 may define a more simple and less elaborate method which may be used to validate whether the second revision includes the actual cause for the test failure of the latest revision or not.

Returning to FIG. 4 and box 414, if, on the other hand, the test results data indicates that the test failed on the first modified version of the latest revision 160-N, the method may conclude that a cause for the test failure has been introduced in another, or a further revision, which is intermediate the second revision 160-$j$ and the latest revision 160-N. Thus, the first candidate revision 160-$j$ is not the only candidate revision. Accordingly, in an attempt to identify a further second candidate revision being a revision including a cause for the test failure of the latest revision 160-N, the method initiates a further iteration of the method, by attempting to identify a further tipping point (box 404).

In this further iteration, the method proceeds as discussed above in connection with box 404. However instead of retesting a number of the revisions preceding the latest revision 160-N, the debug system 130 attempts to identify a tipping point in a sequence of consecutive revisions (which sequence is intermediate the second revision 160-$j$ and the latest revision 160-N) which have been modified using the first change, as determined in box 408 in the previous iteration. Thereby a second tipping point may be identified, formed by a third revision 160-$k$ (where k is in the interval j to N−1) and a consecutive fourth revision 160-$l$ (where l=k+1) of the sequence 160-1 . . . N, which are consecutive to each other and intermediate the latest revision 160-N and the second revision 160-$j$, wherein the third revision 160-$k$ is a revision for which the test passes when it is modified using the determined first change, and wherein the fourth revision 160-$l$ is a revision for which said test fails when said revision is modified using the determined first change. The fourth revision 160-$l$ may be referred to as a second candidate revision 160-$l$ since it is a candidate to being a revision including a cause for the test failure of the latest revision 160-N.

The second tipping point could be successfully identified by the method because the error(s) introduced in the second revision 160-$j$ have been removed from the third revision 160-$k$ and the fourth revision 160-$l$. If the second revision 160-$j$ had been the only revision including a cause for the test failure of the latest revision 160-N, the test would have passed on both the third revision 160-$k$ and the fourth revision 160-$l$ when modified using the first change. However, because an error was introduced also in the fourth revision 160-$l$, a second tipping point arises.

In more detail, the debug system 130 may request the test system 120 to perform the same test on versions of revisions which have been modified using the first change and which revisions precede the latest revision 160-N, until a second tipping point can be identified. The debug system 130 may iteratively retrieve all files of gradually older revisions. For each retrieved revision, a respective modified version thereof may be generated using the first change (e.g. by applying the "patches" or "diffs" to the relevant files of the respective revision). Thereafter, the debug system 130 may, for each modified version of a revision, send a request to the test system 120 to perform the test on the modified version. The debug system 130 may retrieve files of one or a number of revisions at a same time, generate a modified version or respective modified versions thereof, and accordingly iteratively request the test system 120 to perform the test on a gradually older modified revision, one at a time, or on all of said number of modified revisions. In response to receiving test results for the requested revisions, the debug system 130 may attempt to identify the tipping point in the sequence of modified revisions, on the basis of the available test results.

As discussed above, the method may terminate if the maximum number of earlier revisions have been tested without any tipping point being identified, or if no further revisions are stored at the version control system 140 (box 406). The debug system 130 may accordingly generate a message indicating that the cause for the test failure has not been identified. Optionally, the method may terminate in a similar manner also in the case where the second revision 160-$j$ has been reached before any second tipping point has been identified.

Subsequent to identifying the second tipping point formed by the third revision 160-$k$ and the fourth revision 160-$l$ the method proceeds with determining a change (hereinafter referred to as "the second change") made to the software code between the revisions 160-$k$ and 160-$l$ (box 408). The second change may be determined by comparing the third revision 160-$k$ and the fourth revision 160-$l$, in the manner described in connection with box 408 above.

The method proceeds with generating a second modified version of the software code of the latest revision 160-N (box 410). In contrast to the first modified version of the latest revision 160-N, the second modified version is generated using both the first change and the second change. The second modified version may for example be generated by modifying the first modified version of the latest revision using the second change. The second modified version of the latest revision 160-N may be generated using the determined second change such that any software code portions added between the third revision 160-$k$ and the fourth revision 160-$l$, i.e. in the one or more modified files of the fourth revision 160-$l$, are not included in the second modified version, and such that any software code portions removed between the third revision 160-$k$ and the fourth revision 160-$l$, i.e. in the one or more modified files of the fourth revision 160-$l$, are included (i.e. reintroduced) in the modified version. Thereby, changes made between the third revision 160-$k$ and the fourth revision 160-$l$ may be undone, or "unrolled" from the first modified version of the latest software code revision 160-N. Thus a second modified or "patched" version of the latest revision 160-N may be automatically generated by the debug system 130. Files which have been added or deleted in its entirety between the third revision 160-*k* and the fourth revisions 160-*l* may be deleted or added, respectively.

If the debug system 130 is implemented on a computing device such as computing device 300, the one or more generated files listing the changes between the third revision 160-*k* and the fourth revision 160-*l*, as well as the files representing the second modified version, may be stored in the storage device 340.

After the debug system 130 has generated the second modified version of the latest revision 160-N, the debug system 130 requests the test system 120 to perform the same test on the second modified version of the latest revision 160-N (box 412). The request may for example include a reference to the second modified version stored at the debug system 130, allowing the test system 120 to access the files of the first modified version. The reference may for example be provided in the form of a link, such as an URL, to a folder/directory in the storage device 340 storing the files of the second modified version. Upon receiving the test results data from the test system 120 the debug system 130 may determine whether the test passed or failed on the second modified version of the latest revision 160-N on the basis of the test results data (box 414).

If the test results data indicates that the test failed on the second modified version of the latest revision 160-N, the method may conclude that a cause for the test failure has been introduced in another, or a further revision, which is intermediate the fourth revision 160-*l* and the latest revision 160-N. Accordingly, in an attempt to identify this other or further cause the method initiates a further iteration of the method, by attempting to identify a further tipping point (box 404) wherein one or more further iterations of box 406-414 may follow until the method either terminates at box 406, or a test passes on a modified version of the latest revision 160-N.

If, on the other hand, the test results data indicates that the test passed on the second modified version of the latest revision 160-N, the method may conclude that the first change between the first and the second revisions 160-*i* and 160-*j* and the second change between the third and the fourth revisions 160-*k* and 160-*l* introduced a cause for the test failure for the latest revision 160-N. Hence the first candidate revision and the second candidate revision may be determined by the debug system 130 as revisions including a respective cause for the test failure of the latest revision 160-N. Accordingly, the debug system 130 may generate a message indicating the second revision 160-*j* and the fourth revision 160-*l* as each including a cause for the test failure of the latest revision (box 416), optionally along with any of the further information discussed above (e.g. information regarding changes made between the third and fourth revision, a reference to the second modified version of the latest revision etc.). Optionally, the debug system 130 may upload the second modified version to the version control system 140, thereby making available by the version control system 140, a new latest revision, subsequent to the latest revision 160-N, on which the test passes.

As realized by the inventor, the scenario may arise that the changes in the second revision 160-*j* which caused the test to fail on the second revision 160-*j* has been fixed (e.g. manually) in a later revision which is intermediate the third revision 160-*k* and the latest revision 160-N. In that case, the second revision 160-*j* may be ruled out as a candidate to being a revision including a cause for the test failure for the latest revision 160-N. In order to handle this scenario, the method may include an optional act (box 415) of generating a third modified version of the software code of the latest revision 160-N using the determined second change, but not the determined first change. The third modified version may for example be generated by modifying the latest revision (i.e. the original version thereof) using the second change only. Thereby, changes made between the third revision 160-*k* and the fourth revision 160-*l* may be undone, or "unrolled" from the latest software code revision 160-N. Thus a third modified or "patched" version of the latest revision 160-N may be automatically generated by the debug system 130. If the debug system 130 is implemented on a computing device such as computing device 300, the files representing the third modified version, may be stored in the storage device 340. This optional act (box 415) may be performed in connection with generating the second modified version (box 410) or subsequent to determining that the test passed on the second modified version (in box 414).

After the debug system 130 has generated the third modified version of the latest revision 160-N, the debug system 130 requests the test system 120 to perform the same test on the third modified version of the latest revision 160-N. The request may for example include a reference to the third modified version stored at the debug system 130, allowing the test system 120 to access the files of the third modified version. The reference may for example be provided in the form of a link, such as an URL, to a folder/directory in the storage device 340 storing the files of the third modified version. Upon receiving the test results data from the test system 120, the debug system 130 may determine whether the test passed or failed on the third modified version of the latest revision 160-N on the basis of the test results data.

If the test results data indicates that the test failed on the third modified version of the latest revision 160-N, the method may conclude that both the second revision 160-*j* and the fourth revision 160-*l* includes a respective cause for the test failure for the latest revision 160-N. Hence, both the first determined change and the second determined change need to be un-rolled from the latest revision 160-N before the test passes. Hence the first candidate revision and the second candidate revision may both be determined by the debug system 130 as revisions including a respective cause for the test failure of the latest revision 160-N. Accordingly, the debug system 130 may generate a message indicating the second revision 160-*j* and the fourth revision 160-*l* as each including a cause for the test failure of the latest revision (box 416), optionally along with any of the further information discussed above as discussed in connection with box 416 above.

If, on the other hand, the test results data indicates that the test passed on the third modified version of the latest revision 160-N, the method may conclude that the first change between the first and the second revisions 160-*i*, which caused the test to fail on the second revision 160-*i*, already has been fixed and that only the second change between the third and the fourth revisions 160-*k* and 160-*l* includes a cause for the test failure for the latest revision 160-N. Hence the second candidate revision may be determined by the debug system 130 as the revision including a cause for the test failure of the latest revision 160-N. Accordingly, the debug system 130 may generate a message indicating the fourth revision 160-*l* (but not the second revision 160-*j*) as including a cause for the test failure of the latest revision (box 416), optionally along with any of the further information discussed above in connection with box 416 above. Depending on the outcome of the test of the third modified version, the message may include data (e.g. in the form of a link, such as an URL) providing the recipient of the message access to the second modified version (i.e. if the test failed on the third modified version) or the third modified version (i.e. if the test passed on the third modified version). Optionally, the debug system 130 may upload the second modified version (i.e. if the test failed on the third modified version) or the third modified version (i.e. if the test passed on the third modified version) to the version control system 140, thereby making available by the version control system 140, a new latest revision, subsequent to the latest revision 160-N, on which the test passes.

If more than two tipping points have been identified, the method may, in order to handle the scenario where one or more of the candidate revisions of the identified tipping points do not include a respective cause for the test failure of the latest revision, proceed in a similar manner as indicated above, and generate modified versions using all combinations of changes between the pairs of revisions forming the respective tipping points, and testing each thusly generated modified version. For example, for three identified tipping points and three respective changes (C1, C2, C3) the following modified versions of the latest revision 160-N may be generated and tested: 160-N modified using C1; 160-N modified using C2; 160-N modified using C3; 160-N modified using C1 and C2; 160-N modified using C1, C2 and C3; 160-N modified using C1 and C3; 160-N modified using C2 and C3.

As mentioned above, the methods described herein are applicable also for integrated circuit development. In particular, if used in combination with a field-programmable gate array (FPGA), the FPGA may be connected to the debug system 130, wherein the debug system 130, each time the test is to be performed on a revision, may upload the software code of the revision (typically in the form of a hardware descriptor languet) to be tested to the FPGA and thereafter perform the test on the FPGA. As understood by the person skilled in the art, the uploading of the software code to the FPGA results in a reconfiguration of the FPGA and the operation thereof. Hence, by generating and uploading a modified version of a revision for which the test passes to the FPGA (e.g. which may be the first, the second or the third revision described above) the method may automatically debug/reconfigure the hardware (i.e. the FPGA) to provide a hardware which passes the test.

Although in the above, the test system 120 has been described as a component/function which is separate from the debug system 130, it would also be possible to have the debug system 130 itself implement functionality for performing the same test(s) as the test system 120, and thus omit the test system 120. For example the functionality of the test system 120 and the functionality of the debug system 130 could be merged to form a combined test and debug system which could be implemented in a same computer program product on a tangible computer-readable storage medium including instructions arranged to be executed by a processing circuitry, or on a same computing device.

In the above reference has been made to a single test. However, the test referred to in connection with FIG. 4, may form part of a group of tests including a plurality of tests. The group of tests may be an initially manually defined group of tests, formed under the assumption that the results of the tests of the group are related in the sense that they test a same part or aspect of the software/device. The assumption may hence be: if one of the tests of the group fail, the other tests should also fail. Upon existence of such a group of tests, the test referred to in connection with FIG. 4 may be selected on the basis of being the only test of the group which meets a predetermined performance criterion, such as being the test presenting the shortest execution time or being the test having the smallest memory requirements. The selected test may hence form a "pilot test" of the group of tests. Subsequent to reaching a conclusion in the method in FIG. 4, and thus successfully identifying the revisions(s) including a cause for the failure of the pilot test failing when performed on the latest revision 160-N, each one of the tests of the group, other than the pilot test, may be performed on the modified version on which the pilot test eventually passed (e.g. the first, the second or the third modified version of the latest revision 160-N) (box 418). These other tests may be performed by the test system 120 in the same manner as the pilot test, as described above. On the basis of the test result from each of these tests when performed on the modified version of the latest revision 160-N, the method may proceed with removing each test from the group of tests which failed when performed on the modified version and keeping each test in the group of tests which passed when performed on the modified version (box 420). Thereby a (possibly) reduced group including a smaller number of tests which have been automatically validated to be related may be obtained. The group of tests may be recorded in a file maintained by the debug system 130, which file lists the tests which belong to the group. When a test is determined to be removed from the group the file may be updated accordingly. The debug system 130 may indicate in a request sent to the test system 120 which test(s) of the group should be performed on the modified version. Tests which have been removed from the group may be assigned to another group of tests which are assumed to be related. If two or more group of tests are defined, a pilot test may be selected for each group and used to test the latest revision as described above. As may be understood, the total number of revisions on which the slower or more memory consuming tests of the groups of tests need to be performed on may be reduced.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:
1. A method for identifying a cause for a failure of a computer-implemented test performed on a latest source code revision in a sequence of a plurality of source code revisions, the method comprising, subsequent to said test failing on the latest source code revision:
    identifying a first candidate revision in the sequence of revisions as a first candidate for including a cause for the test failure on the latest revision, said identifying comprising:
        identifying a first revision of said sequence of revisions for which said test passes and a second revision of said sequence of revisions which is consecutive to the first revision and for which said test fails, wherein the second revision forms the first candidate revision;
    validating whether the first candidate revision includes an actual cause for the test failure of the latest revision, said validating comprising:
        determining a first change between the source code of the first revision and the source code of the second revision, the determining comprising gen- erating one or more files listing changes made in the source code between the first and second revisions, subsequent to determining said first change, generating a first modified version of the source code of the latest revision using the determined first change according to said one or more files listing changes made in the source code between the first and second revisions, wherein the first modified version of the source code of the latest revision is generated using the first change such that a source code portion added between the first revision and the second revision is not included in the first modified version, and such that a source code portion removed between the first revision and the second revision is included in the first modified version, and determining whether said test passes or fails when performed on the first modified version;

in response to determining that said test fails when performed on the first modified version:

identifying a second candidate revision in the sequence of revisions as a second candidate for including a cause for the test failure on the latest revision, said identifying comprising: identifying a third revision and a fourth revision of said sequence which are intermediate the latest revision and the second revision, wherein the third revision is a revision for which said test passes when said revision is modified using the determined first change according to said one or more files listing changes made in the source code between the first and second revisions, and wherein the fourth revision is consecutive to the third revision and is a revision for which said test fails when said revision is modified using the determined first change according to said one or more files listing changes made in the source code between the first and second revisions, and wherein the fourth revision is the second candidate revision;

validating whether the second candidate revision includes an actual cause for the test failure of the latest revision, said validating comprising:

determining a second change between the source code of the third revision and the fourth revision, the determining comprising generating one or more files listing changes made in the source code between the third and fourth revisions, subsequent to determining said second change, generating a second modified version of the source code of the latest revision using the first change according to said one or more files listing changes made in the source code between the first and second revisions and using the second change according to said one or more files listing changes made in the source code between the third and fourth revisions, wherein the second modified version of the source code of the latest revision is generated using the first change and the second change such that a source code portion added between the first revision and the second revision and a source code portion added between the third revision and the fourth revision are not included in the second modified version, and such that a source code portion removed between the first revision and the second revision and a source code portion removed between the third revision and the fourth revision are included in the second modified version, and determining whether said test passes or fails when performed on the second modified version; and in response to determining that said test passes when performed on the second modified version, providing a message indicating at least the fourth revision as including a cause for said test failing when performed on said latest source code revision.

2. A method according to claim 1, further comprising: in response to determining that said test passes when performed on the first modified version, providing a message indicating the second revision as including a cause for said test failing when performed on said latest source code revision.

3. A method according to claim 1, further comprising receiving test results data resulting from said test being performed on at least a subset of the revisions of said sequence, the test results data indicating, for each revision of said at least a subset, whether said test passed or failed when said test was performed on said each revision.

4. A method according to claim 3, wherein the first revision and the second revision are identified by determining, using the test results data, a first pair of consecutive revisions in said sequence such that an earlier revision of the first pair is a revision for which the test results data indicates that said test passed and a later revision of the first pair is a revision for which the test results data indicates that said test failed.

5. A method according to claim 1, wherein the identification of the first and the second revision is performed in response to determining that said test fails when performed on the latest source code revision.

6. A method according to claim 1, further comprising: receiving test results data resulting from said test being performed on the first modified version, the test results data indicating whether said test passed or failed when said test was performed on the first modified version, wherein said determining whether said test passes or fails when performed on the first modified version is based on the received test results data.

7. A method according to claim 1, further comprising: receiving test results data resulting from said test being performed on the second modified version, the test results data indicating whether said test passed or failed when said test was performed on the second modified version, wherein said determining whether said test passes or fails when performed on the second modified version is based on the received test results data.

8. A method according to claim 1, further comprising generating a third modified version of the source code of the latest revision using the second change, wherein, subsequent to determining that said test passes when performed on the second modified version, the method further comprises:

determining whether said test passes or fails when performed on the third modified version, and providing, in response to determining that said test fails when performed on the third modified version, a message indicating the second revision and the fourth revision as including a cause for said test failing when performed on said latest source code revision, or providing, in response to determining that said test passes when performed on the third modified version, a message indicating the fourth revision, but not the second revision, as including a cause for said test failing when performed on said latest source code revision.

9. A method according to claim 8, further comprising: receiving test results data resulting from said test being performed on the third modified version, the test results data indicating whether said test passed or failed when said test was performed on the third modified version, wherein said determining whether said test passes or fails when performed on the third modified version is based on the received test results data.

10. A method according to claim 8, wherein the third modified version of the source code of the latest revision is generated using the second change, but not the first change, such that a source code portion added between the third revision and the fourth revision is not included in the third modified version, and such that a source code portion removed between the third revision and the fourth revision is included in the first modified version.

11. A method according to claim 8, wherein the third modified version of the source code is generated subsequent to determining that said test passes when performed on the second modified version.

12. A method according to claim 1, wherein the sequence of source code revisions are stored in a storage area by a version control system, each revision being represented by a different set of one or more source code file objects.

13. A method according to claim 12, further comprising retrieving from the version control system information regarding a user identity associated with each of the one or more revisions determined as including a cause for said test failing when performed on said latest source code revision, and sending an instance of said message to each one of said user identities.

14. A method according to claim 12, further comprising providing user access to one or more of the first, the second or the third modified versions of the latest revision.

15. A method according to claim 1, wherein said test belongs to a group of tests and the method further comprises:

in response to determining that said test passes when performed on the first modified version: determining whether each other test of said group of tests passes or fails when performed on the first modified version, and removing from said group of tests each test which fails when performed on the first modified version, or in response to determining that said test passes when performed on the second modified version: determining whether each other test of said group of tests passes or fails when performed on the second modified version, and removing from said group of tests each test which fails when performed on the second modified version, or in response to determining that said test passes when performed on the third modified version: determining whether each other test of said group of tests passes or fails when performed on the third modified version, and removing from said group of tests each test which fails when performed on the third modified version.

16. A method according to claim 15, wherein said test is the test of the group of tests which meets a predetermined performance criterion, such as being the test presenting the shortest execution time or being the test having the smallest memory requirements.

17. A method according to claim 1, wherein said test is a defined by a set of software instructions and configured to evaluate whether at least a subset of the source code of a given revision meets a predefined criterion or a predefined set of criteria.

18. A method according to claim 1, wherein said test is a build test.

19. A method according to claim 1, wherein said test is one of a performance test or a runtime test.

* * * * *

UNITED STATES PATENT AND TRADEMARK OFFICE
CERTIFICATE OF CORRECTION

PATENT NO.          : 10,509,693 B2
APPLICATION NO.     : 15/555275
DATED               : December 17, 2019
INVENTOR(S)         : Daniel Hansson Page 1 of 1

It is certified that error appears in the above-identified patent and that said Letters Patent is hereby corrected as shown below:

On the Title Page

Item (72), in Column 1, please correct:
-- (72) Inventor: Daniel HANNSON, Lund (SE) to Daniel HANSSON, Lund (SE) --.

Signed and Sealed this
Fourth Day of February, 2020

Andrei Iancu
*Director of the United States Patent and Trademark Office*